US011242937B2

(12) United States Patent
Cocciardi

(10) Patent No.: US 11,242,937 B2
(45) Date of Patent: Feb. 8, 2022

(54) VALVE FOR LARGE SCALE IRRIGATION

(71) Applicant: COUNTRY COCKY PTY LTD, Cranbourne (AU)

(72) Inventor: Peter Anthony Cocciardi, Cranbourne (AU)

(73) Assignee: COUNTRY COCKY PTY LTD

( * ) Notice: Subject to any disclaimer, the term of this patent is extended or adjusted under 35 U.S.C. 154(b) by 0 days.

(21) Appl. No.: 16/613,725

(22) PCT Filed: May 15, 2018

(86) PCT No.: PCT/AU2018/000071
§ 371 (c)(1),
(2) Date: Nov. 14, 2019

(87) PCT Pub. No.: WO2018/209377
PCT Pub. Date: Nov. 22, 2018

(65) Prior Publication Data
US 2020/0072371 A1 Mar. 5, 2020

(30) Foreign Application Priority Data

May 15, 2017 (AU) ............... 2017901799
May 19, 2017 (AU) ............... 2017901907

(51) Int. Cl.
*F16K 27/06* (2006.01)
*F16K 15/06* (2006.01)
*F16K 1/36* (2006.01)
*F16K 47/02* (2006.01)
*F16K 1/06* (2006.01)
(Continued)

(52) U.S. Cl.
CPC .............. *F16K 27/067* (2013.01); *F16K 1/06* (2013.01); *F16K 1/36* (2013.01); *F16K 15/063* (2013.01); *F16K 27/0209* (2013.01); *F16K 27/0254* (2013.01); *F16K 27/07* (2013.01)

(58) Field of Classification Search
CPC ...... F16K 27/067; F16K 1/06; F16K 27/0254; F16K 27/07; F16K 25/00; F16K 1/36–38; F16K 15/06–063; F16K 47/023; F16K 15/02–021; F16K 15/025–026; F16K 27/0209; Y10T 137/7922
See application file for complete search history.

(56) References Cited

U.S. PATENT DOCUMENTS 328,979 A * 10/1885 Schutte ................... F16K 47/00
 137/514.3
1,421,184 A * 6/1922 Dome ..................... F16K 15/06
 137/519

(Continued)

FOREIGN PATENT DOCUMENTS

CN  204140963   2/2015
FR  1279361    12/1961

*Primary Examiner* — Marina A Tietjen
(74) *Attorney, Agent, or Firm* — Nguyen Tarbet LLC

(57) ABSTRACT

A valve assembly (10) for large scale irrigation including a valve body (20) and a valve head (40). The valve head is adapted to reciprocally travel along a longitudinal axis, supported by a longitudinally aligned shaft (60) inside the valve body. The valve head includes a wall (41) terminating in a peripheral sealing contact surface (42), the wall extending inwardly from the peripheral contacting surface.

20 Claims, 15 Drawing Sheets

(51) Int. Cl.
*F16K 27/02* (2006.01)
*F16K 27/07* (2006.01)

(56) References Cited

U.S. PATENT DOCUMENTS

| | | | | |
|---|---|---|---|---|
| 2,447,729 | A | * | 8/1948 | Bertea .................. F16K 15/063 137/543.23 |
| 3,811,470 | A | * | 5/1974 | Schaefer ............... F16K 15/063 137/540 |
| 4,766,929 | A | * | 8/1988 | Yaindl .................... F16J 15/062 137/514.3 |
| 4,886,085 | A | | 12/1989 | Miller |
| 4,928,726 | A | * | 5/1990 | Johnson ................. F16K 15/06 137/327 |
| 2004/0134540 | A1 | * | 7/2004 | Yumoto ................ F16K 15/063 137/542 |
| 2009/0145497 | A1 | | 6/2009 | Takeda |
| 2011/0000556 | A1 | | 1/2011 | Klemm |
| 2013/0092261 | A1 | | 4/2013 | Andersson |
| 2014/0216575 | A1 | | 8/2014 | Ikeda et al. |
| 2015/0122353 | A1 | | 5/2015 | Chiba |
| 2016/0178076 | A1 | | 6/2016 | Cellemme et al. |
| 2020/0124182 | A1 | * | 4/2020 | Abouelleil ................ F16K 1/48 |

* cited by examiner

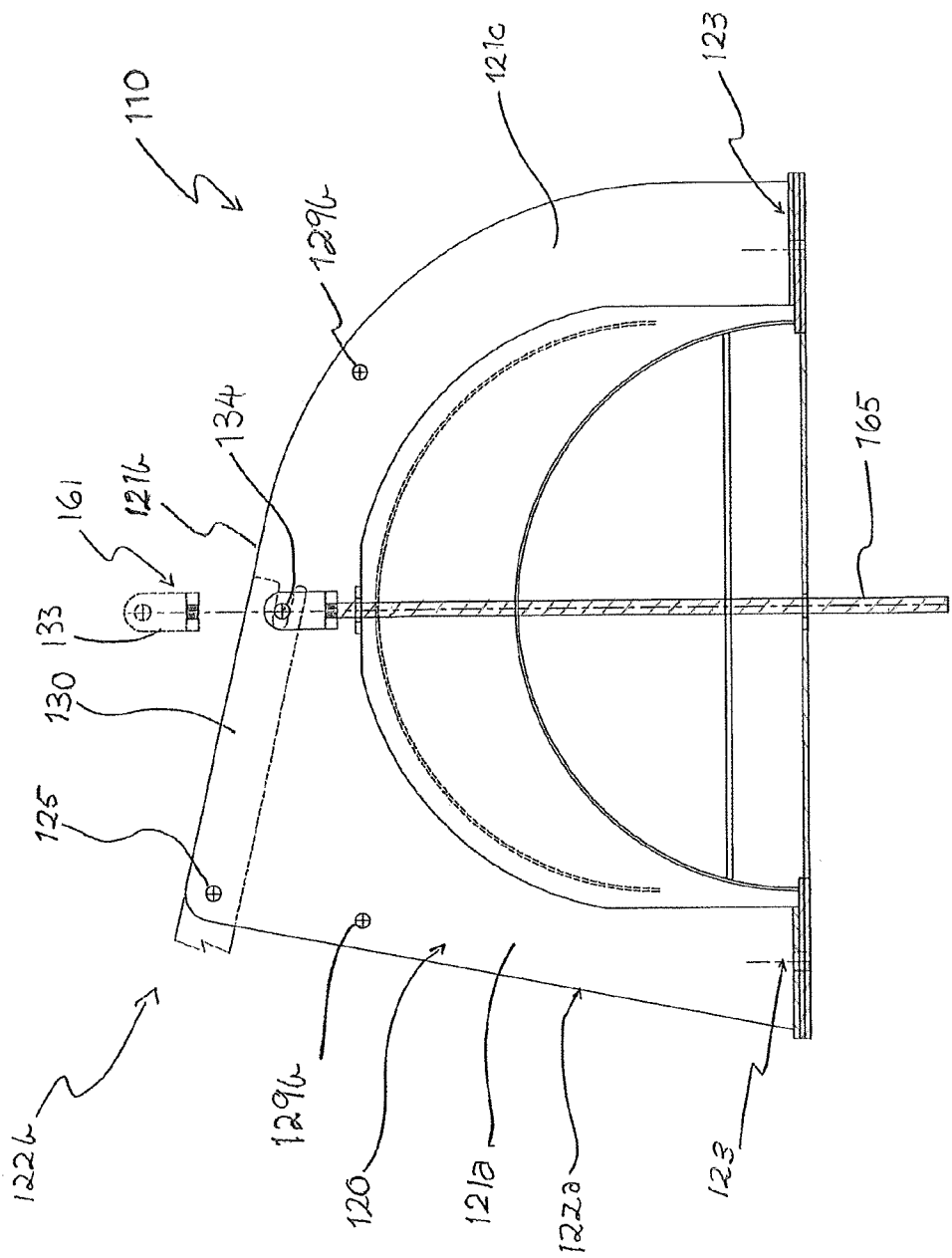

VALVE FOR LARGE SCALE IRRIGATION

FIELD OF INVENTION

This invention relates to a valve for large scale irrigation. More particularly, this invention relates to a non-planar valve for large-scale irrigation. Still more particularly, this invention relates to a non-planar valve adapted to travel along a linear pathway.

BACKGROUND ART

The following references to and descriptions of prior proposals or products are not intended to be, and are not to be construed as, statements or admissions of common general knowledge in the art. In particular, the following prior art discussion should not be assumed to relate to what is commonly or well known by the person skilled in the art, but to assist in the inventive process undertaken by the inventor (s) and in the understanding of the invention.

Large scale irrigation applications may involve heads of pressure in the range 1-20 m, with variations being seasonal, the result of strategic use of water resources and/or may be dependent on weather events, such as drought or heavy rainfall. Typically heads of pressure in large scale irrigation applications vary between 1-6 m, with extreme heads of pressure being as much as about 18 m.

There are a number of non-return and check valves on the market. For example, flap valves are sold with side or centrally mounted hinges. Examples of this type are found in the AC31 wafer single flap check valve, the VT-WCF-316-300 flanged swing check valve, the FCROV CR PVC plastic wafer check valve and the AC10 duo check wafer valve. The V3Wc 316S 3 piece check valve has a central compressible spring. All of these prior art valves are supplied by an Australian company, Avfi Pty Ltd. These prior art valves must either be forced open or shut against the flow of water, with broad sealing contact surfaces requiring high heads or substantial force to maintain the seal. Debris tend to get caught in and around the hinge and compromise the seal.

A better arrangement is required for large scale irrigation applications. An object of the present invention is to ameliorate the aforementioned disadvantages of the prior art or to at least provide a useful alternative thereto.

STATEMENT OF INVENTION

The invention according to one or more aspects is as defined in the independent claims. Some optional and/or preferred features of the invention are defined in the dependent claims.

Accordingly, in one aspect of the invention there is provided:

A valve assembly including a valve head fitted to a supply line,
wherein:
the valve head is adapted to reciprocally travel along a longitudinal axis, supported by a shaft longitudinally aligned parallel to general direction of water flow from the supply line; and
the valve head includes a wall terminating in a peripheral sealing contact surface for sealing engagement with a valve seat defining an aperture that is continuous with the supply line when the valve assembly is in an open position, the wall extending inwardly from the peripheral contacting surface towards the shaft.

Supply Line

The valve assembly is preferably for large scale irrigation. The valve assembly may be used in the regulation of a channel and/or pumping system. The supply line may form part of the irrigation system. The supply line may be a short or long section of pipeline. The supply line may be connected to a channel, stream, duct or further upstream supply line. The supply line may be a cylindrical pipeline. The valve assembly may be substantially aligned parallel, or even coaxially, with the supply line. The valve assembly may connect to a T-intersection in the supply line. The valve assembly may extend traversely relative to a main passage of the supply line. The valve assembly may be located at a terminal end if the supply line.

Valve Body

The valve head may be housed in a valve body. The valve body may extend from the supply line. The valve body may be cylindrical or conical in overall shape. The valve body may have walls that are generally concave or convex and may have a generally truncated fusiform ("cigar") or curved conical overall shape. The valve body may be a complex shape comprising, for example, a junction between 3 or more branches, such as a T-junction. The valve body includes a valve opening adapted to be releasably sealed by the valve head.

The valve body may be in the form of a truncated cone. A wider diameter end may be positioned lower than a narrower neck. The neck may be positioned uppermost.

The valve body and the valve head may be formed from a single dome piece. An upper dome portion of the upper region of the semi-spherical body may be absent whereby the valve body is partially spherical, including half-spherical or a lesser portion thereof. An upper portion of the dome may be cut out. The upper dome portion may be cut off the dome by various means, such as laser cutting or mechanical cutting, leaving an outwardly convexly curved truncated conical cylinder having a wide open end at or near the peripheral sealing contact surface and a central narrow open end. The curved cylinder may be used to form the valve body and the removed top portion of the dome may be used to form part of the valve head. The removed top portion of the dome may be used to form the wall of the valve head.

The opening may be defined by a flange extending around the inner periphery of the valve body. The flange may be circular. The flange preferably provides a broad surface for a valve seat. The opening may be defined by a circular plate with the opening forming an aperture in the circular plate. The circular plate may be attachable to an end of the valve body. The plate may be attached to the wider end of the ends of the valve body.

The valve seat preferably includes a resiliently deformable surface. This may include an additional layer of material applied or attached to a base of the valve seat. The valve seat is preferably adapted to be indented by the peripheral sealing contact surface (hereinafter referred to as "the contact surface") for low head applications, the valve seat may comprise a relatively soft and pliable resiliently deformable material, such as a relatively soft rubber or other polymeric gasket. Preferably the valve seat comprises a nitrile rubber.

Where large head (a reference to water pressure and height differentials) applications are envisaged, the valve seat may comprise a hardened rubber. In each case, the valve seat should be adapted to be indented a small distance by impression from the contacts surface, but not to the extent of the valve seat surface being broken or the integrity of the valve seat material being compromised. For example, a low head application might require a valve seat material having a shore rating of 40 A, whereas a high head application might require a rubber, such as urethane rubber, with a 60-100 shore A rating. The valve seat is typically round and presents a sufficiently broad width to accommodate the tolerances of the particular application. A typical annular valve seat would have a width of 10-40 mm between its outer periphery and its inner periphery, an aperture of 100-1200 mm and a depth of between 2-25 mm.

Rather than provide a flange or plate for the valve seat, the valve body may include a stepped transition from a wider diameter to a narrower diameter or be counter bored to provide a shoulder therein.

The valve body may be cast, extruded or formed from welded sheet metal according to standard practices in the art of large scale irrigation.

Valve Head

The wall may be curved. The wall may be an outer wall of the valve head. The wall may be outwardly convex in shape. The peripheral sealing contact surface may be adapted to seal against a valve seat surrounding a valve opening. The outer wall is preferably in the form of a skirt. The wall may be in the form of a dome.

The wall preferably terminates in and forms the peripheral sealing contact surface. The peripheral sealing contact surface is preferably adapted to abut the valve seat.

The skirt edge advantageously forms the contact surface. The valve head may be co-axially mounted to the shaft. The valve head may include two bearing surfaces. The first bearing may be an apex bearing formed in an aperture at the apex of a dome of the valve head and the second bearing may be a co-axial plate bearing formed in a central aperture located in an internal plate through which the shaft passes. Accordingly, the apex of the dome and plate apertures may receive, in fixed relationship, the shaft, and be sealed around the join thereof. The dome and the internal plate may therefore define a cavity in the valve head. The cavity may be sealed against ingress of water.

The internal plate may serve to add weight to the valve head to provide greater force by virtue of gravity in a downward direction. The internal plate also may be adapted to provide bracing strength to the dome shaped wall of the valve head. The dome shape is geometrically strong. The depending skirt at its lower end (arbitrarily referring to the apex as its upper end), resists upward axially aligned forces transferred through the lower edge by evenly distributing through the dome structure. Therefore, in a sealed and closed position, the valve head maintains the integrity of its shape and structure against large axial forces applied from the valve seat.

Downward axial forces applied to the apex and immediate surrounds of the convex wall of the valve head are similarly evenly distributed through the wall structure. Downward axial forces applied further out radially from the apex or longitudinal axis are increasingly tangentially deflected as the tangential angle of the wall approaches axial alignment at its radial outermost. Accordingly, the valve head is adapted to maintain shape integrity, irrespective of the magnitude of the head pressure.

The valve head mounted to the shaft is preferably adapted to move between an open position and a closed position. The valve head is adapted to substantially seal against a valve seat surrounding the valve opening in the closed position.

The valve head is preferably adapted to reciprocally travel along a longitudinal axis coaxial or parallel to the shaft between a range of a fully closed position and a fully open position;

The valve head is preferably adapted to seal the opening in the fully closed position. This may constitute the complete impedance of flow through the opening or may permit only substantially reduced flow through the opening.

In the fully open position, the valve head may be adapted to permit substantially unimpeded water flow through the opening.

In partially open positions between the fully closed position and the fully open position, the valve head may be adapted to permit restricted water flow through the opening.

The valve head may be formed from a cast or moulded spherical or dome die. Preferably, the valve head is formed from hemi-spherical components. Preferably, the valve body comprises a metal curved plate in the shape of a dome or partial dome. Advantageously, a semi-spherical dome may be used to manufacture both the valve body and the valve head.

Preferably, the valve head comprises substantially a dome-shaped bowl to which a substantially internal plate may be inserted within the cavity defined by the bowl whereby to close off most of the cavity. The internal plate may be outwardly concave. The internal plate is preferably substantially flat and planar. Accordingly, the internal plate may be a circular plate sealing the cavity and extending across the internal wall of the valve head. A small skirt may extend beyond the junction of an internal surface of the valve head and another peripheral edge of the internal plate. The internal plate may be welded or otherwise attached to the internal wall surface of the valve head.

The contact surface may be formed from the downwardly depending edge of the dome, wall or skirt. The contact surface preferably comprises a thin edge. The peripheral sealing contact surface may be in the form of a terminal edge that is no more than 6 mm. preferably 4 mm, and most preferably 3 mm thick. In any case, the edge should be thin enough to form a reliable seal against the valve seat. The edge is preferably adapted to substantially uniformly through its length or extent form a marginal indentation in the valve seat. Preferably, the edge is adapted to indent the valve seat without breaching the surface or affecting the structural integrity of the valve seat. The peripheral sealing surface preferably corresponds to the wall thickness of the valve body. The peripheral sealing contact surface may be continuous. The peripheral sealing contact surface is preferably a shape corresponding to the valve seat surrounding the opening. The peripheral sealing contact surface may be substantially triangular, square, oval-shaped or circular. Preferably, the peripheral sealing contact surface is substantially circular.

The angle of approach of the peripheral sealing contact surface may vary between 45 and 90° relative to the valve seat surface. The contact surface may be formed by making a cut through the semi-spherical dome at an angle substantially normal in transverse section or profile to the longitudinal axis. The contact surface may comprise a substantially flat surface. The contact surface may lie in a single plane transverse to the longitudinal axis. The contact surface may include an edge substantially equal to the width of the valve head wall or a thickness slightly greater. The angle of the cut may be close to normal (right angles) relative to the tangent of the curve of the valve head dome shape. The angle of the cut may be aligned with the single plane transverse to the longitudinal axis.

Alternatively, the valve head dome's terminal edge may be formed by a cut that is angular relative to the single plane. The cut may angular to the tangent of the curve of the dome. The long most edge of the contact surface may be a relatively sharp edge with converging walls. The converging walls may be set at up to 45° relative to the single plane normal to the longitudinal axis. The sharp or angular terminal edge may be formed by beveling the edge of the dome. The edge is preferably formed by a cut made substantially through the single plane normal to the longitudinal axis.

The small and sharp contact surface formed at the edge combine with an opposed and engageable valve seat of suitable softness or hardness to form a sealed or closed valve. The combination of the valve head and the valve seat may be adapted to form a highly efficient seal compared to prior art valve assemblies. In prior art assemblies the sealing surface may be wide, broad and flat, thereby requiring considerable force to achieve sealing.

In contrast, the relatively small contact surface area of the valve head on the valve seat is adapted to achieve a highly effective seal, even in low head applications. Balance must be exercised in determining the width or sharpness of the edge. A broad peripheral sealing contact surface of the order of 3 mm-6, may be advantageous for large head applications involving very large valves up to 600-1000 mm in diameter, and those where a softer valve seat are desirably employed.

An edge that is sharper, for example 0.2 mm-3 mm, and preferably 0.5-1 mm, is useful to facilitate an effective seal in lower head applications. To broaden an edge of a valve head wall with a thickness narrower than desirable for the head of water drop in the particular irrigation application, the edge may be rolled or pressed to present a broader edge surface to the valve seat. Where the edge is required to be narrower than the wall thickness, the edge may be bevelled to form an edge narrower than the wall thickness.

The diameter of the valve head, or the spacing between opposed edges, for large scale applications is typically in the range of about 50 mm-600 mm, with sizes of 200 mm-400 mm being typical, and valve head sizes of 300 mm and 600 mm being achievable using the valve head of the present invention.

Shaft

The shaft is advantageously of a consistent cross-section throughout its length. The shaft may be mounted to the valve body downstream by a first star bracket affixed to the internal surface of the valve body. The shaft may be of circular or square cross-section. It is noted that a longitudinal key may be useful where it is advantageous to maintain the axial orientation of the valve head relative to the valve body.

The shaft may be movably secured to the valve body whereby to stabilise the shaft against radially or lateral movement. The shaft may be mounted directly or indirectly to the valve body.

Preferably, the shaft is radially secured to the valve body using one or more, and preferably two, bearing sites. Where one bearing site is used, the engineering parameters should be such that a bearing surface of the bearing site is of sufficient axial length that it resists lateral movement or twisting due to torsional forces.

Preferably, the shaft is secured radially relative to the valve body using at least two axially spaced bearing sites. The shaft may be secured using an upper bearing surface located at or near the neck of the valve body. The shaft may be secured using a lower bearing surface located at or near the base of the valve body. The shaft may be mounted for reciprocal axial travel relative to the valve body.

The upper bearing surface may be laterally secured using an upper bracket attached to the valve body. The upper and lower brackets may be star shaped brackets having one or more lateral spokes. The upper bracket may radially fix the upper bearing surface encasing an upper section of the shaft radially and centrally in axial alignment to the longitudinal axis of the valve body.

The lower bracket may similarly secure the lower bearing surface encasing a lower section of the shaft. The upper or lower bearing surface may comprise a self-lubricated bearing surface, such as a polytetrafluoroethylene (PTFE) ring or bearing, or another low friction bearing means or material.

The upstream end of the shaft may be received in a dampening device. The dampening device may be fixed to the internal wall of the valve body by a second star bracket and may extend upstream and may be in the form of a cylinder adapted to receive the upstream end of the shaft.

The cylinder may include a series (two or more) graded apertures whereby the upstream end of the shaft progressively seals apertures at the upstream end of the cylinder as it travels further into the cylinder to achieve a dampening effect. There may be a small aperture at the upstream terminal end of the cylinder.

Accordingly, as the valve head closes and water is displaced in the cylinder by the shaft moving in the upstream direction, apertures may be progressively closed so that the apertures collectively provide progressively and collectively less surface area for egress of water from the cylinder.

Accordingly, as the contact surface approaches the valve seat, preferably the speed of approach of the valve head slows until it comes into contact with the valve seat. The dampener may reduce the hammering effect that might otherwise be associated with the rapid approach of the valve head towards the valve seat as the water travelling past the contact surface and through the opening accelerates with the ever closing gap and reducing surface area of the available area for egress of water through the opening.

The dampener may counteract this tendency for the valve head to accelerate in its travel towards the valve seat on closing and may therefore be adapted to reduce wear and tear and prolong the useful life of the valve assembly components.

BRIEF DESCRIPTION OF THE DRAWINGS

The invention may be better understood from the following non-limiting description of preferred embodiments, in which:

FIG. 2 is a sectional isometric view of a valve head and shaft combination according to the embodiment shown in FIG. 1a;

FIG. 3b is an exploded isometric sectional view of the dampener component shown in FIG. 3a;

FIG. 4a is a sectional side elevation of the dampener shown in FIG. 3a;

FIGS. 5a-5b are exploded isometric views of the valve assembly shown in FIG. 1a;

FIG. 6a is an upper exploded isometric view of the valve assembly shown in FIG. 1a;

FIG. 6b is a lower exploded isometric view of the valve assembly shown in FIG. 1a;

FIG. 7b is a lower isometric view of the valve assembly shown in FIG. 1a;

FIG. 8 is a side sectional view of a valve assembly according to a second embodiment shown in a closed position, with an open position of the valve head shown in ghosted outline;

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

Figure 1B:
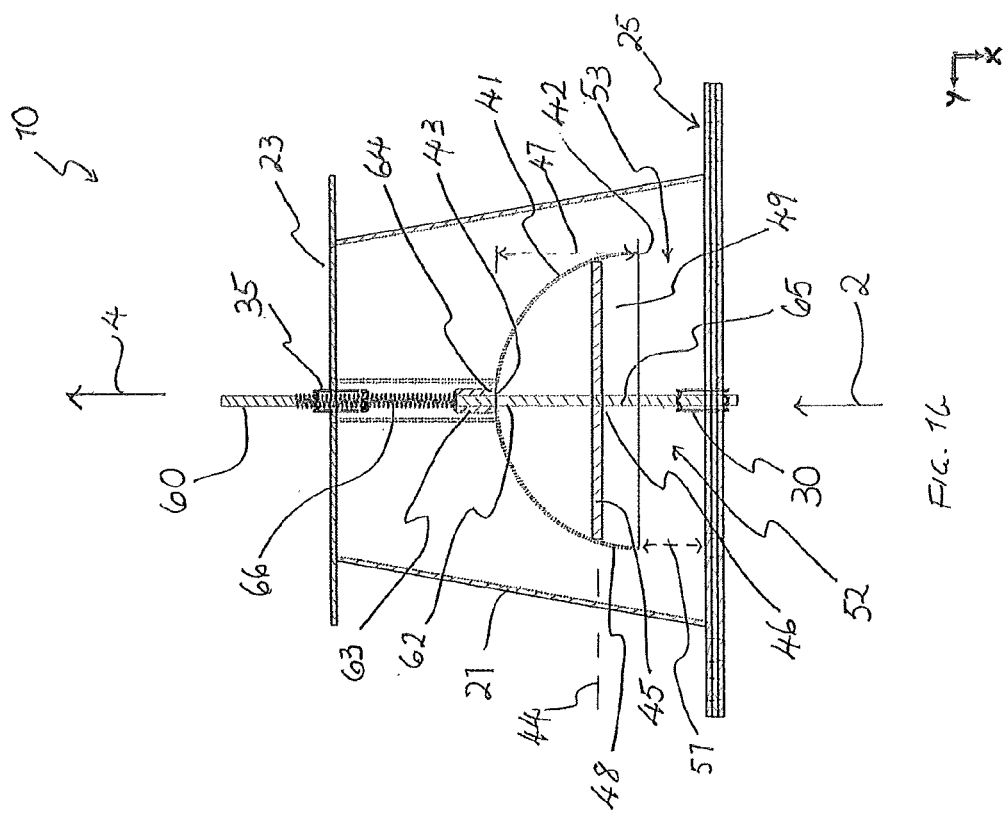
FIG. 1b is a sectional side elevation of the valve assembly shown in FIG. 1a, but with a valve head in an open position.
Figure 1A:
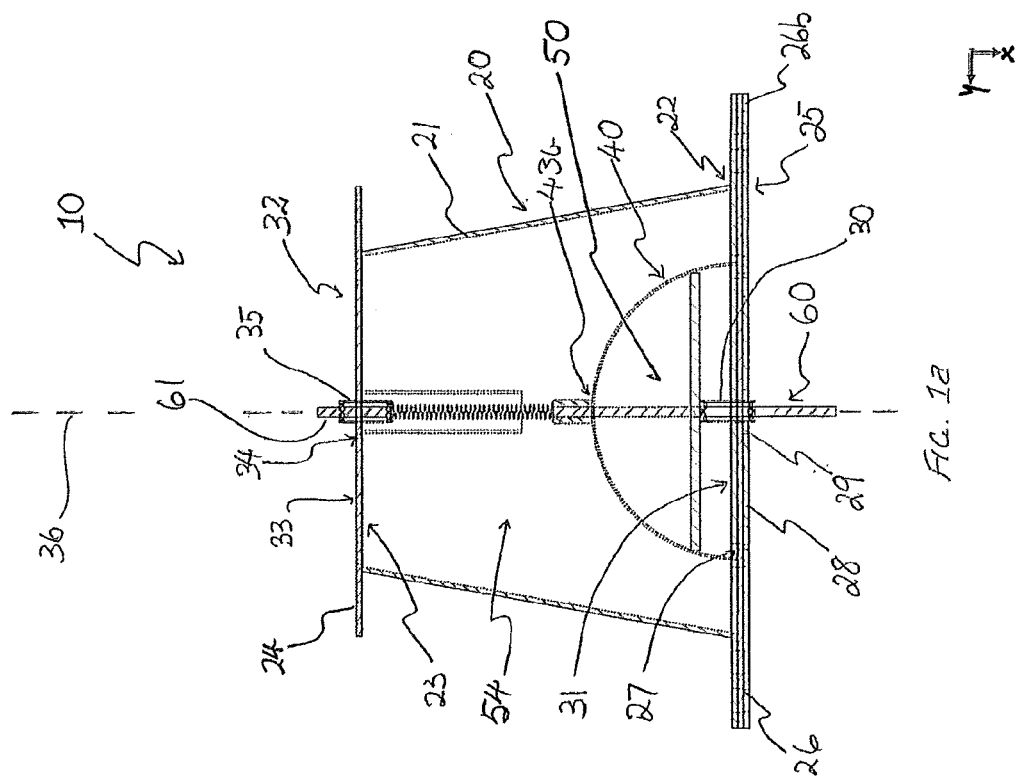
FIG. 1 is a sectional side elevation of a valve assembly according to a preferred embodiment.

Referring to the drawings and particularly FIGS. 1a and 1b, there is shown a valve assembly for large scale irrigation. The valve assembly 10 includes a valve body 20, a valve head 40 and a central shaft 60.

The valve body 20 comprises a truncated cone wall 21 having a wide base 22 and an upper narrower neck 23 with an upper terminal collar, flange or circular plate 24 defining an upper valve body opening 32.

The base 22 has mounted by welding to its lower edge a rigid circular plate member 25 that may be formed by welding a pair of 6 mm thick circular plates 26 in super imposed relationship together. The upper surface of the base is formed from a third layer of hard rubberised material 27, such as nitrile (acrylonitrile butadiene) rubber, that forms a valve seat. The lower most plate 26b of the base includes a triplet of circumferentially spaced radial spokes 28. The spokes 28 may meet at a central position in a lower central bearing surface or ring 29 into which there may be inserted a lower bearing surface 30 having a low-friction (e.g. PTFE) internal surface to facilitate the axial reciprocal travel of the shaft 60 therein. Rather than three, there may be two or four or more spokes 28 and they may be spiral or otherwise outwardly extending from the ring 29, but a triplet of radial spokes is preferred for strength, symmetry and minimal interference with water flow.

The base 25 defines a central valve opening 31. Similarly, the upper plate 24 defines the upper central open end 32 and has a triplet of radial spokes 33 that laterally secure an upper central ring 34 into which an upper bearing 35 is mounted to locate the upper section 61 of the shaft 60 against radial movement, whilst permitting the shaft 60 to reciprocally travel along a longitudinal axis 36 of the valve body 20.

The valve head 40 comprises a semi-spherical dome 41 having a dome wall 41a terminating in a lower peripheral edge 42 and having a central aperture 43 at its apex 43b through which an intermediate portion 62 of the shaft 60 extends. The intermediate portion 62 is fixed to an intermediate bearing surface 63, the lower most end 64 of which is welded to the apex 43b of the dome 41 surrounding the aperture. Therefore, the shaft 60 and valve body 40 are fixed and move together.

Inserted within the dome 41 and lying in a plane 44 normal to the longitudinal axis 36 is an internal plate 45 that is solid, impervious and preferably disc-shaped, but for a central aperture 46 through which the lower portion 65 of the shaft 60 extends. Of course, the internal plate 45 could be replaced by two or more circumferentially spaced radial braces, but a solid plate is preferred to exclude fluid from the inner space of the dome 41, which may effect turbulence. The lower portion 65 is welded in fixed relationship to the internal plate 45, so that the valve head 40 is laterally and torsionally stabilised relative to the shaft 60 by virtue of the fixed attachment points at the apertures 43, 46.

Interposed between the intermediate bearing 63 and the upper bearing 35 is an axial compression spring 66 that provides bias against the open position shown in FIG. 1b and urges the valve body 40 towards the closed position shown in FIG. 1a.

The internal plate 45 is inserted into the dome 41 to an extent between about 3%-50% of the height 47 of the dome. The height of the dome may be measured from a point taken from the lower edge 42 up to a position laterally equivalent to the apex 43b. The lower portion of the dome wall 41 may provide a skirt 48. The lower edge may be beaded, folded, flattened for a broad surface, or bevelled or sharpened, for example by laser cutting. The skirt 48 advantageously terminates in the sharp lower edge 42. Accordingly, the lower edge may be in width advantageously the equivalent of the thickness of the dome wall 41. Or the edge 42 may be bevelled to provide a sharper edge. For a broader edge, the dome may be cut through a plane parallel to plane 44 or the lower edge 42 may be rolled into a bead or bent into a shoulder or flange.

In use, upon the valve head 40 being urged downwardly into abutment with the base 25 and, more particularly, the valve seat 27, the lower edge 42 deforms the corresponding contacting surface of the valve seat 27, or causes an indentation therein without breaking the integrity of the surface thereof, to ensure a good seal. The seal is improved by the spring 66 bias and the head of water on the upper (downstream) side of the base 25.

To open the valve assembly 10, an upstream 2 pump may be activated to provide positive pressure on the lower (upstream) side 2 of the base 25 thereby forcing the valve body 20 upwardly as water enters a recess 49 defined by the skirt 48 and the lower surface of the internal plate 45. Where the internal plate 45 is a solid plate and not substituted with radial braces, for example, water does not enter the cavity 50 defined by the upper section of the dome wall 41 and the upper surface of the internal plate 45. The valve head 40 is adapted to axially shift upwardly (towards downstream) to an extent whereby water entering the valve opening 31 is substantially unimpeded by the valve head 40. The applicant has found that a displacement distance 51 of a magnitude at least one quarter of the diameter of the valve opening 31 provides sufficient clearance by the valve head 40 such that water flow in the direction 4 is unimpeded as it flows into the intervening space 52 between the base 25 and the valve head 40 and around the sides of the valve head 40 as it travels in the downstream 4 direction.

Figure 2:
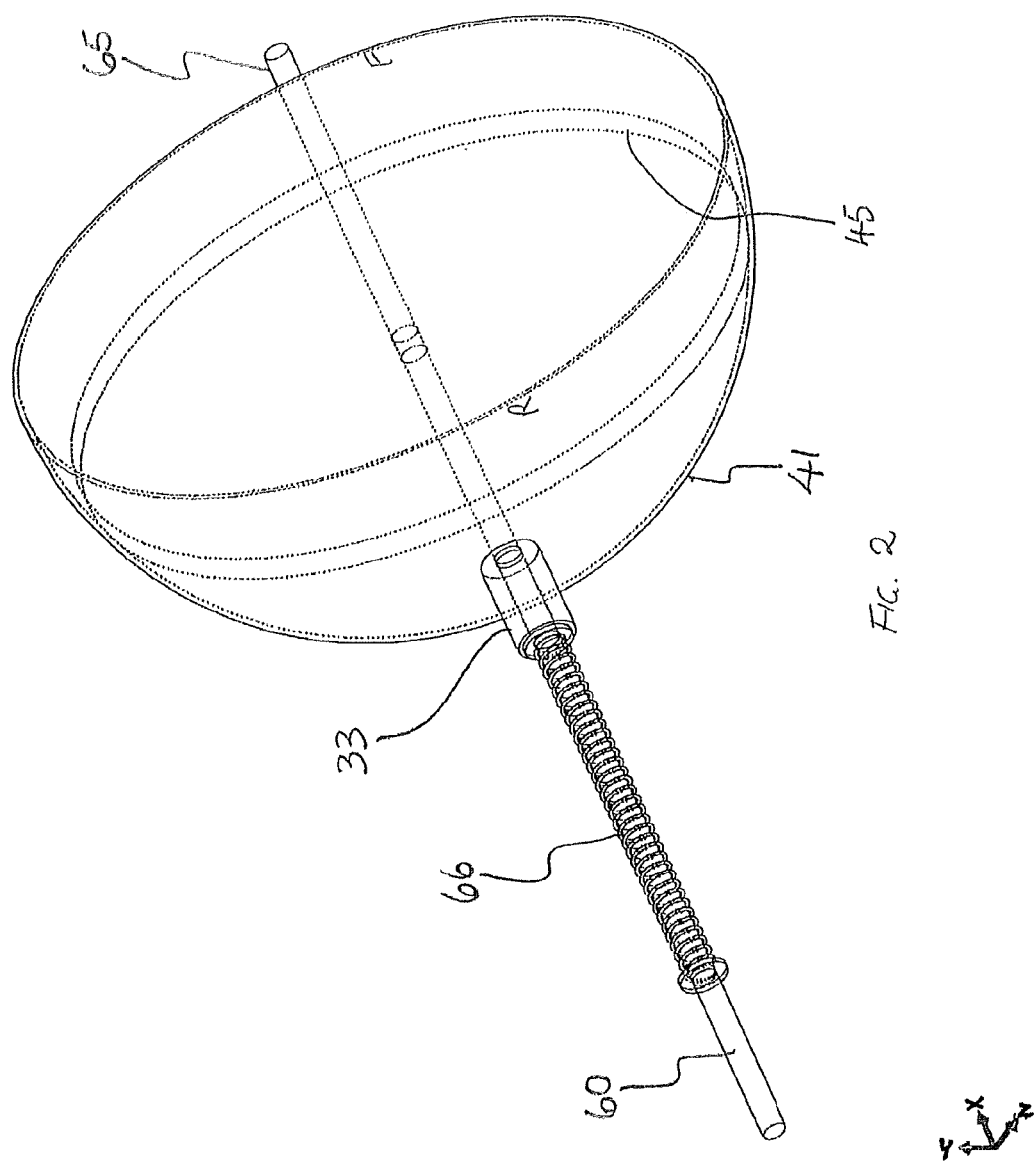
Figure 3A:
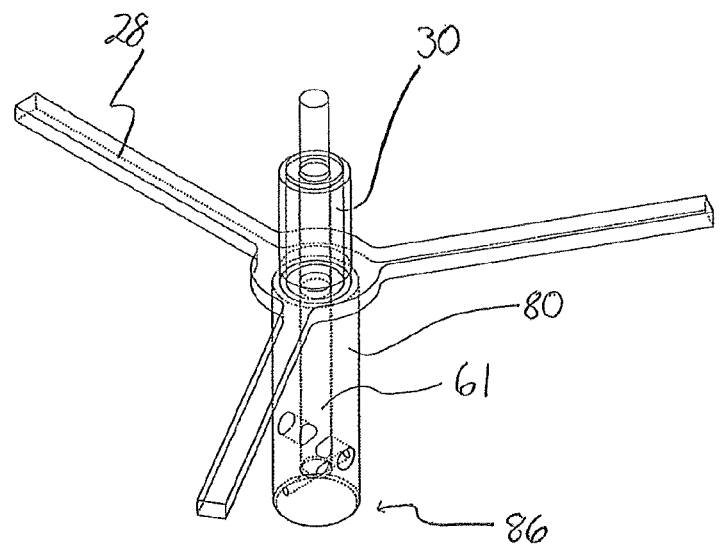
FIG. 3a is a isometric sectional view of a dampener component of the valve assembly shown in FIG. 1a in a closed position.
Figure 3B:
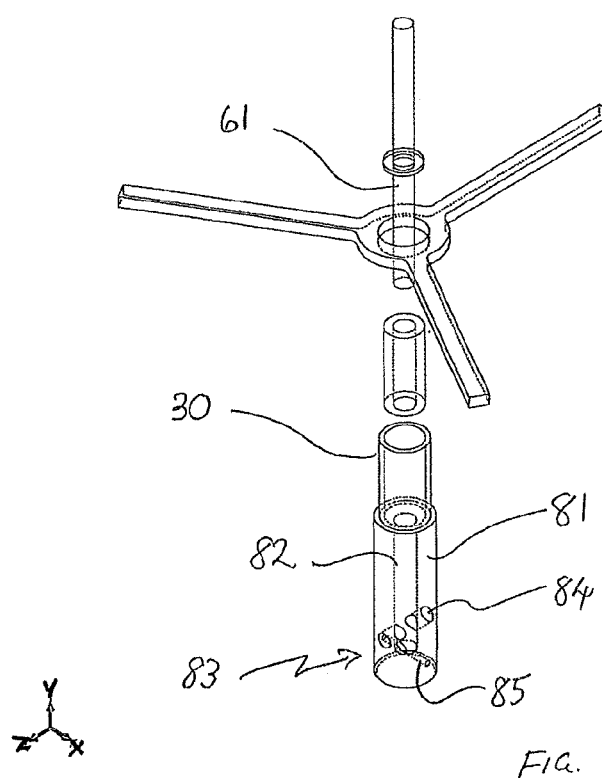
Figure 4A:
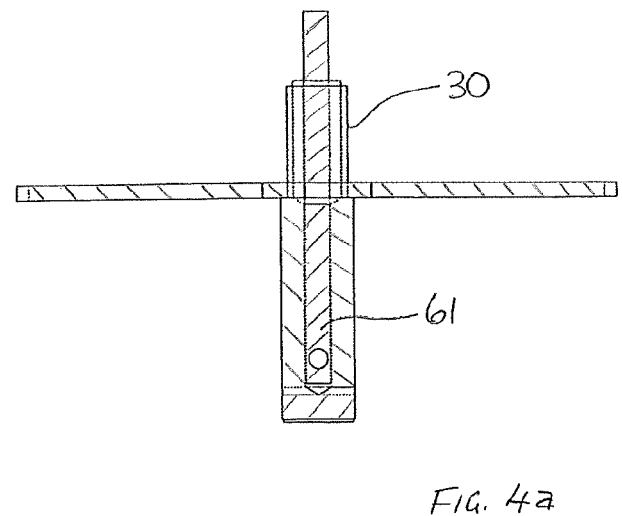
Figure 4B:
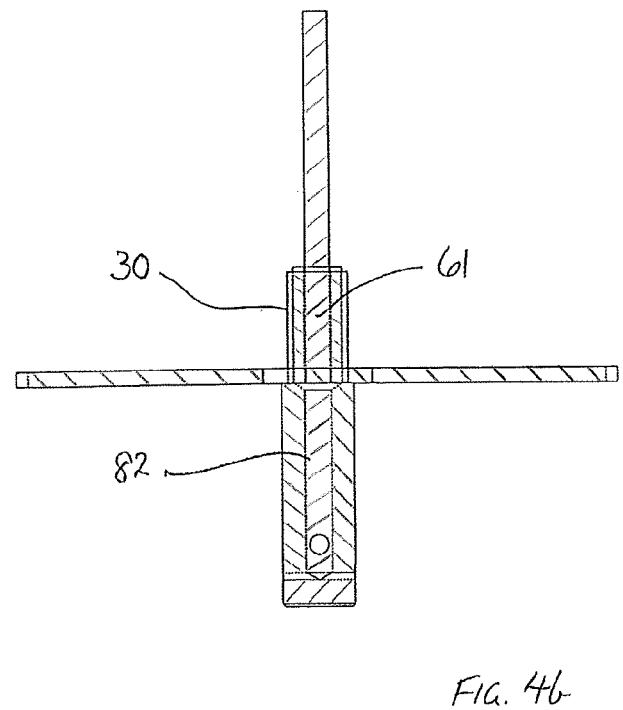
FIG. 4b is a sectional side elevation of the dampener shown in FIG. 4a in an open position.
Figure 5B:
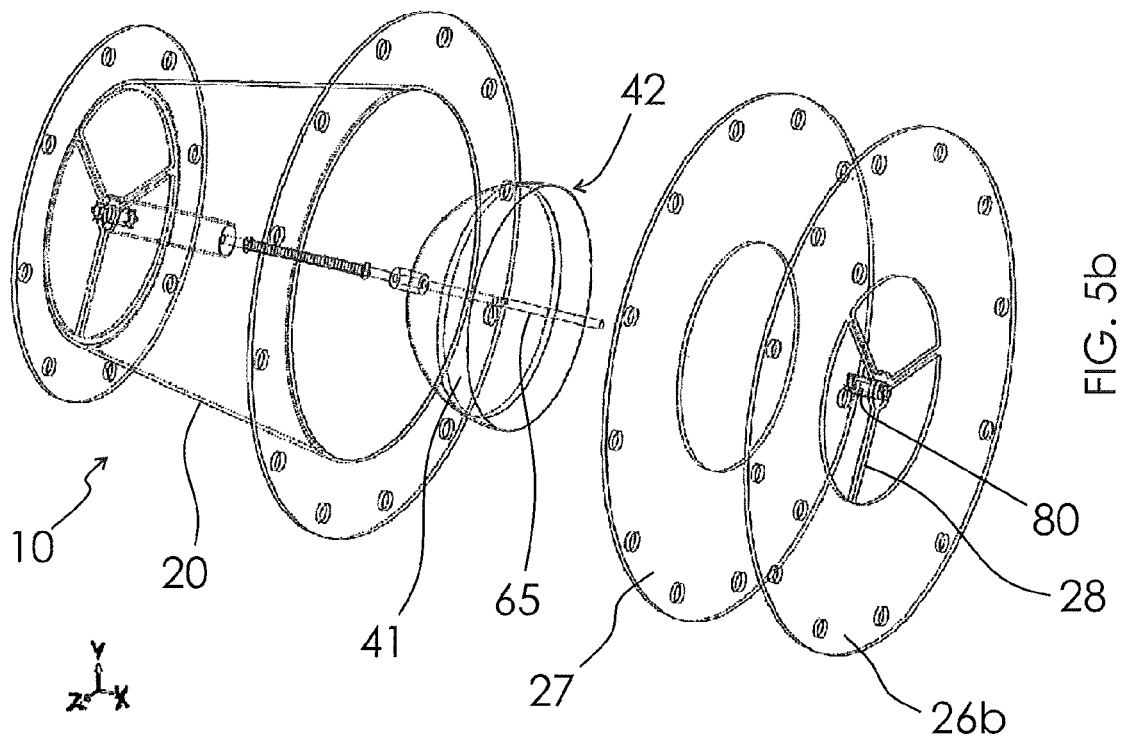
Figure 5A:
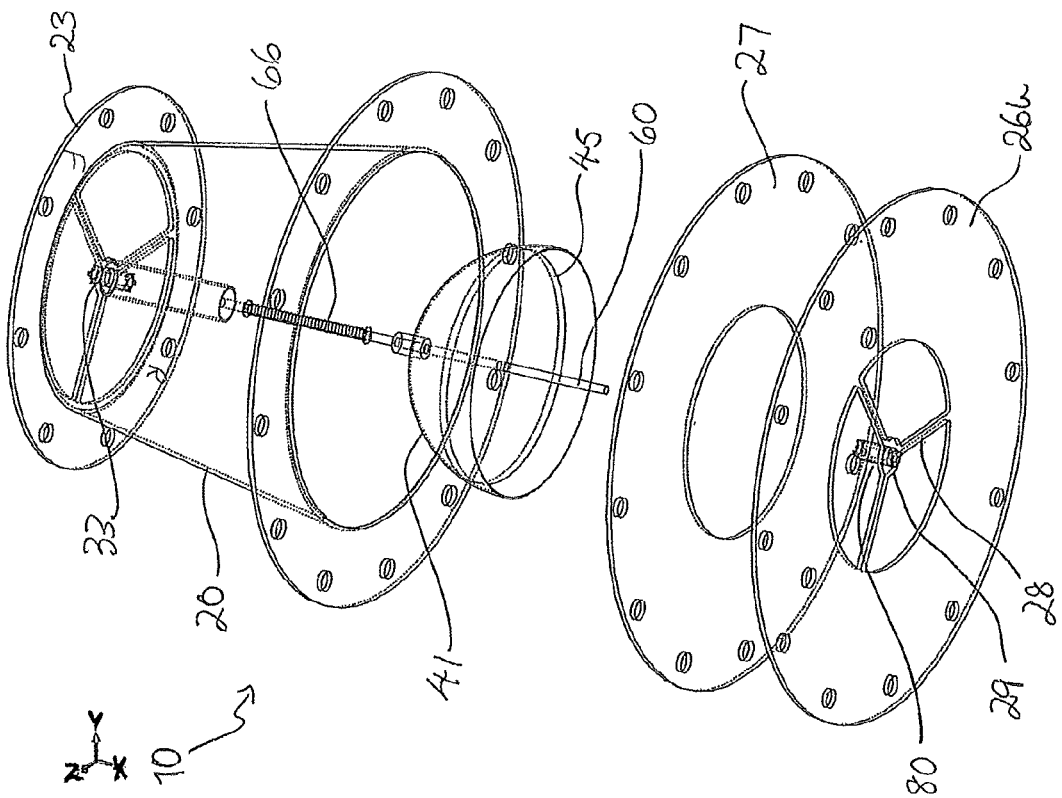
Figure 6B:
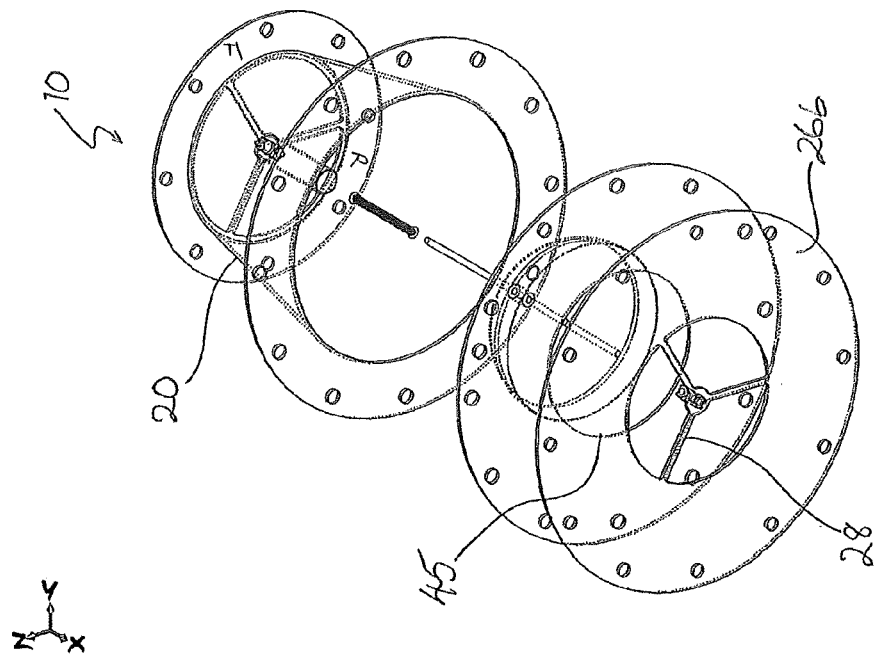
Figure 6A:
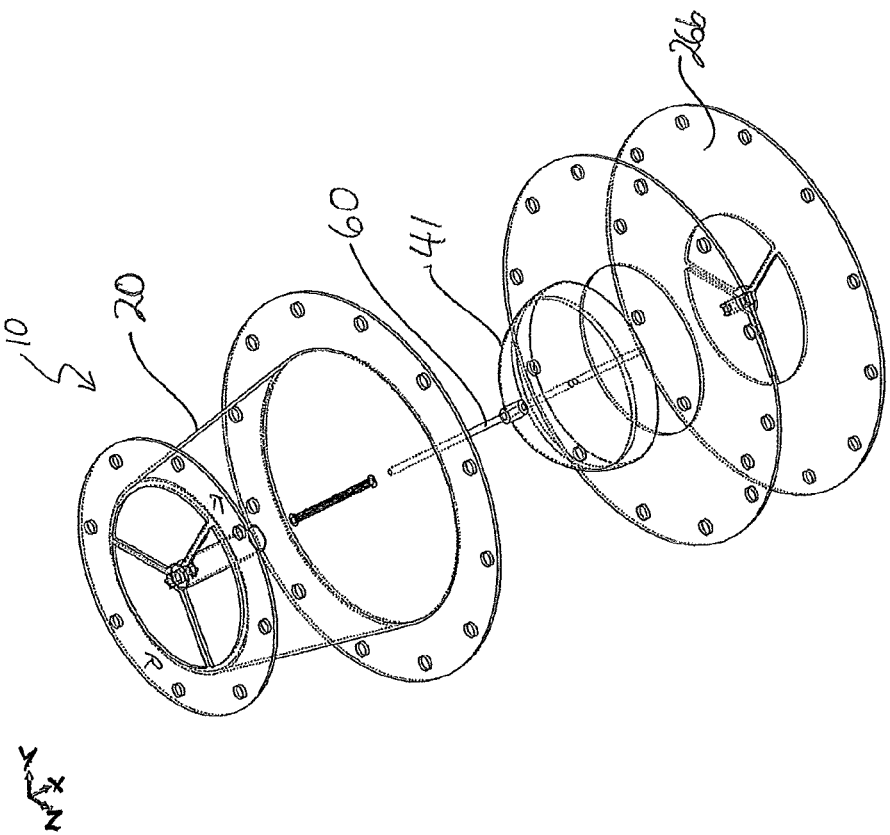
Figure 7A:
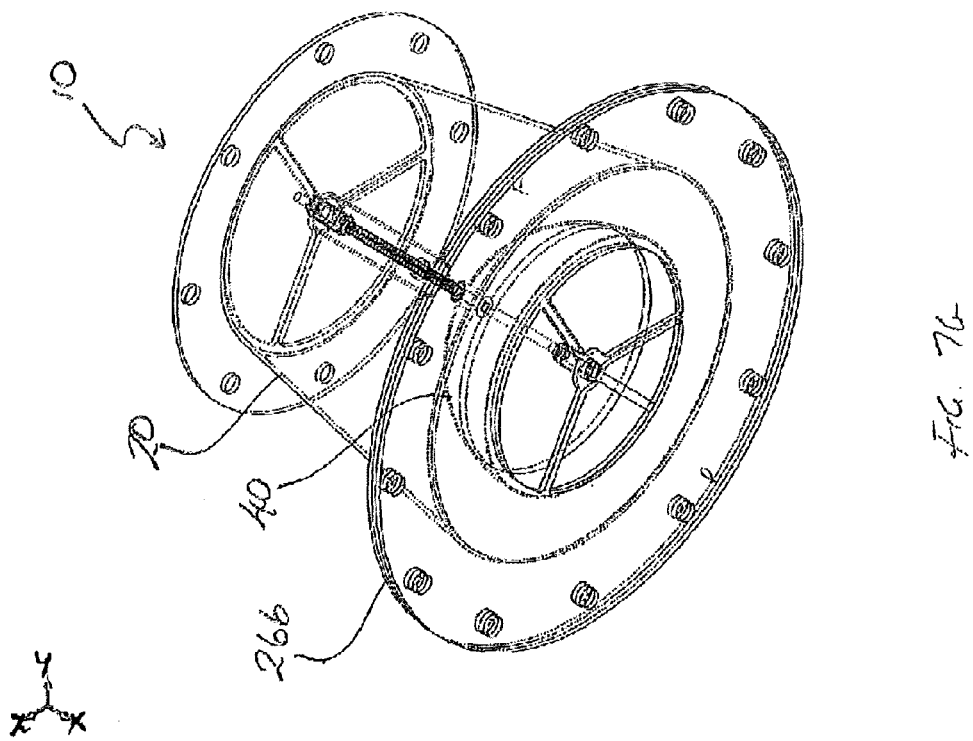
FIG. 7a is a lower isometric view of the valve assembly shown in FIG. 1b.
Figure 7B:
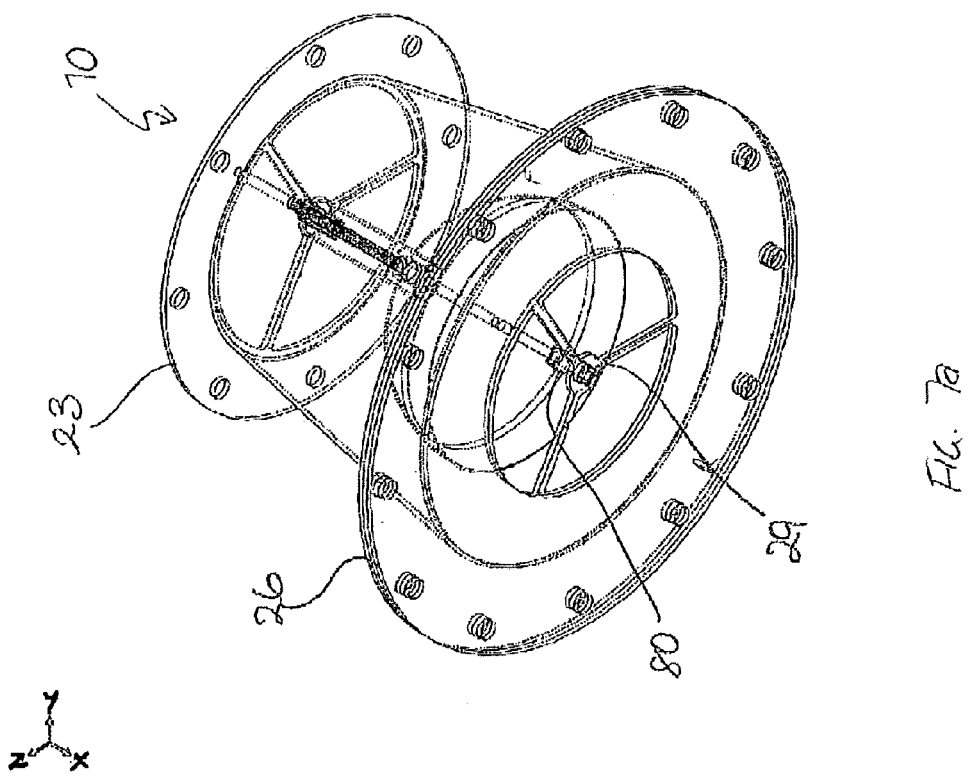

As shown in FIGS. 3a-4b, a dampener 80 may be mounted to the lower bearing 30 and star bracket 28. The dampener 80 comprises a cylinder 81 with a central bore 82 sized to receive the lower shaft portion 65 in a substantially tight, but low friction relationship in which the lower shaft portion 65 (refer to FIG. 2) is adapted to travel axially within the bore 82. When the valve head 40 is in the open position, the lower portion 65 of the shaft 60 travels axially upwardly out of the bore 82 and is retained in the corresponding and coaxial bore of the lower bearing 30.

If inflow into the valve assembly 10 ceases, for example because an upstream 2 pump is turned off, the head of water downstream 4 and filling the valve body 20 cavity 50 provides a head of pressure that may vary between 1 and 20, more typically 3-18, and most typically 3-6 metres head of pressure, depending on the local application and conditions. This head of pressure bears down on the upper surface of the dome wall 41a and water in the cavity 54 begins rushing through a gap 53 between the lower edge 42 and the valve seat 27, and through the aperture 31. The effect of gravity and the spring 66 bias urges the valve head 40 downwardly towards the valve seat 27. As the lower edge 42 approaches the valve seat 27, water passes through the gap 53 at an ever accelerating rate.

However, the shaft 60 is fixed to and moves with the valve head 40, so that the lower shaft portion 65 enters the central cylinder bore 82 and approaches an end 83 of the bore 82. At the lower end 86 of the cylinder 81, there are provided a series of escape ports 84-85 that provide graduated egress of water trapped in the bore end 83. The lower section 65 of the shaft 60 serves to block the side apertures 84 as it passes thereby to reduce the potential surface area available for egress for water from the bore end 83, so that the downward travel of the shaft 60 is substantially arrested after passing the side apertures 84. A small aperture port 85 is provided at the very end of the bore end 83 to enable the shaft 60 to complete its downward travel to its fullest extent to the bore end 83, thereby permitting downward travel of the shaft, but at a restricted velocity as it approaches the downward end of its travel.

Figure 9A:
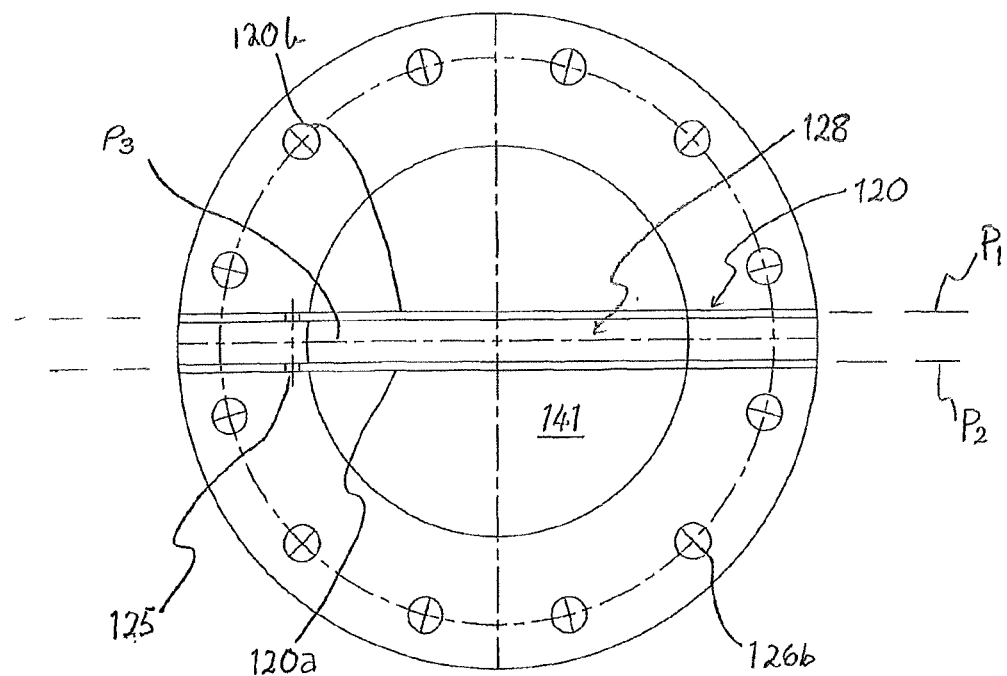
FIG. 9a is a top plan view of the valve assembly shown in FIG. 8.
Figure 9B:
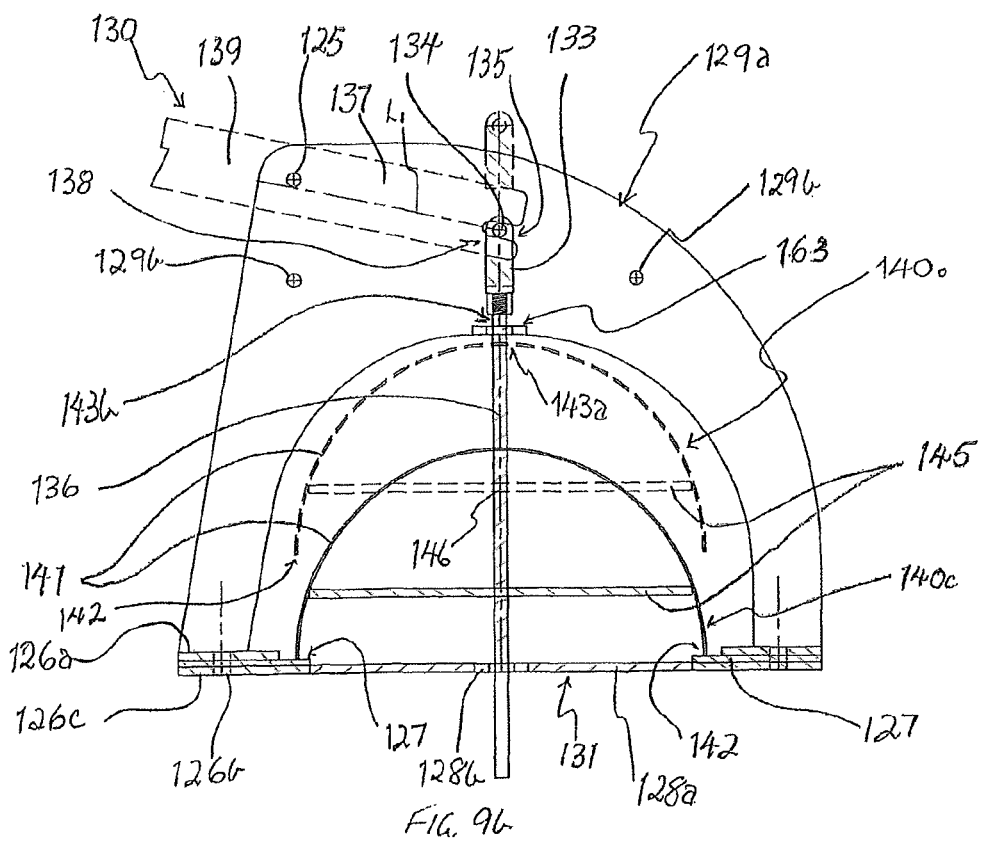
FIG. 9b is a side sectional view of the valve assembly according to the second embodiment, with the valve head shown in open and closed positions.
Figure 10:
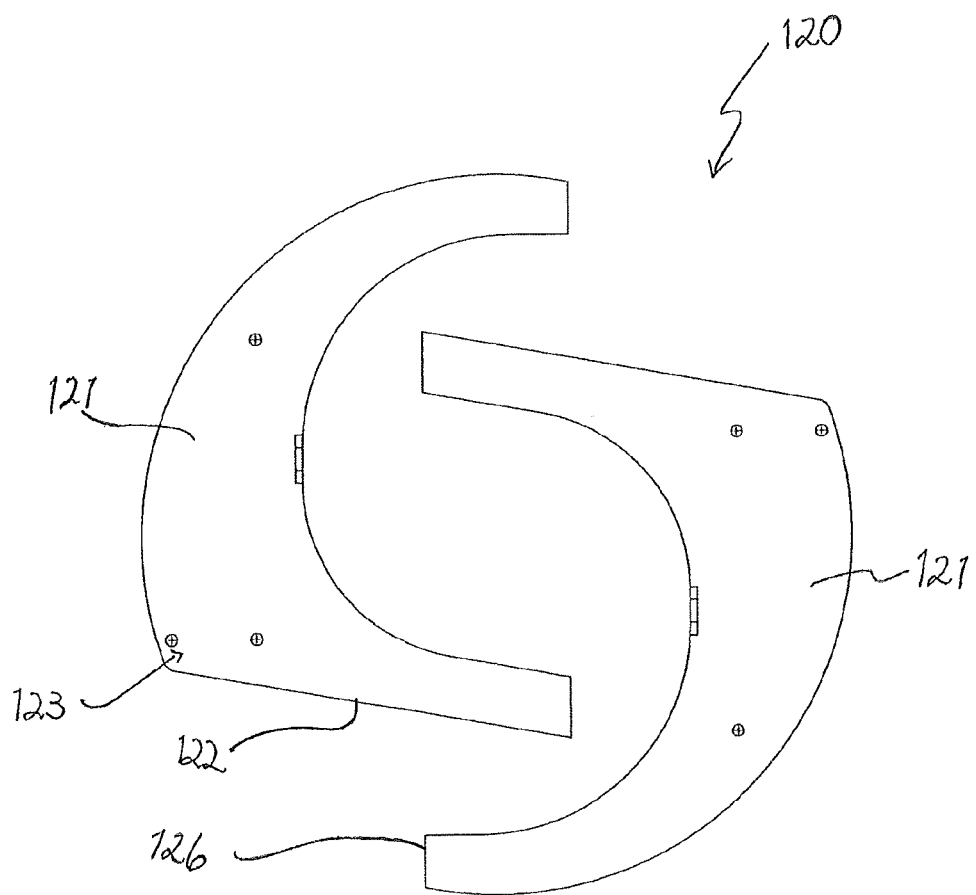
FIG. 10 is a side plan view of components of a support structure used in the valve assembly of the second embodiment.

With reference to FIGS. 8-10 a terminal inlet valve 110 is shown according to a second embodiment.

The inlet valve 110 includes a support structure 120. The support structure 120 comprises an arm 120a. The arm 120a is shaped like an arch. The arm 120a is asymmetrical. The arm 120a includes a first leg 121a with a steeply inclined side wall edge 122a, a second spaced leg 121c, and a bridge 121b spanning therebetween. The first leg 121a is contiguous with an upper corner portion 122b at a hinge end of the bridge 121b.

The support structure 120 includes the first arm 120a, and a second arm 120b. The pair of arms 120a,b are the mirror image of each other. The arms 120a,b each include two legs 121a, including the steeply inclined leg 121a and the second leg 121c contiguous with the bridge 121b. The second leg 121c curves up from a base 123, transitioning into the bridge 121b.

The arms 120a,b are positioned to stand in parallel planes $P_{1,2}$ spaced from each other.

Apertures for the hinge 125 lie in registration in each corner 122b to receive and support a hinge shaft or a pair of hinge pins extending therethrough. Preferably, a journalled hinge shaft or a spacer sleeve is provided to support the correct spacing of the arms 120a,b in their respective parallel planes $P_{1,2}$. The correct spacing is determined by the spacing needed to allow the lever 130 to pivot without being encumbered by the arms 120a,b.

In the corner portion 122b, a hinge 125 is provided. The hinge 125 rotatably supports the lever 130. The spaced support arms 120a,b define a channel 128 in which the lever 130 travels reciprocally in a central plane $P_3$ as it pivots about the hinge 125. Spacing of the pair of arms 120a,b at their lower portions is achieved by mounting the arms 120a,b at their bases 123 to an upper surface of a circular plate 126a forming part of a valve seat 127 structure. The pair of arms 120a,b are also spaced by a pair of spacer bolts 129b set in the upper region 129a of the arms 120a,b.

The arms 121a,b are formed from thick plate steel or aluminium or any other suitable substantially rigid material. The arms 120a,b may be cut out of the same type of steel sheeting used to form an internal plate 145 formed in a valve head 140. The valve head 140 formed in a similar manner to the valve head 40.

The valve head 140 includes a lower peripheral circular edge 142 that forms a seal on a valve seat 127. The valve seat 127 is a ring of resilient and hard rubber axially trapped between a pair of circular steel plates 125,126 clamped together by bolts 126b circumferentially spaced around the upper and lower plates 126a,c. The upper plate 126a defines a wider aperture that exposes the upper surface of the seat 127. The seat 127 is well supported by the upper surface of the lower plate 126c. The rubber seal 127 and the lower plate 126c are preferably radially coextensive. The seat 127 and/or the lower plate 126c define a valve opening 131.

The valve head 140 comprises a hemi-spherical dome 141 through which a shaft 160 is adapted to extend. The shaft 160 is coaxially located in the valve head 140 and extends through an aperture 143a near the apex 143b. The shaft 160 is located in place by one or more nuts 163 axially threadably mounted on the shaft 160 to axially fix the dome 141 relative to the shaft 160. Therefore the valve head 140 is fixed to and moves with the shaft 160. A lower portion 165 of the shaft extends through a centrally located ring 128b. The ring 128b is radially held in the central position by a set of, preferably comprising three, spokes 128a extending inwardly from the lower plate 126c. The shaft 160 is further fixed radially so that its travel is linear and coaxially in line with the shaft 160 axis 136 and with the valve head 140. The shaft 160 reciprocates through by a central aperture 146 formed in the internal plate 145.

As best seen in FIGS. 8 and 9b, an upper portion 161 of the shaft 160 is terminally located in a ferrule 133. The upper portion 161 may be threadably inserted in a female recess of the ferrule 133. The upper end of the ferrule 133 includes a lateral pin 134 adapted to be received in a slot 135 formed in the terminal end 138 of the lever 130. The slot 135 is aligned parallel to the longitudinal axis (in line with plane P3) of the lever 130. The length of the slot 135 is sufficient to allow the rotational motion of the lever 130 to be transferred to linear motion of the shaft 160 whilst retaining the pin 134 in, and sliding relative to, the slot 133. The pin 134 reciprocally travels in the slot whilst the pin 134 travels up and down the longitudinal axis 136 of the shaft 160.

It can be seen in FIG. 9b that the shaft 160 is adapted to move up and down along a linear pathway along the axis 136. The shaft's 160 movement is determined by the lever 130 being pushed up or down through the plane $P_3$. As a consequence, the valve head 140 moves up and down with the shaft 160 to either expose the valve opening 131 or seal it shut by the placement of the lower peripheral edge 142 on the valve seat 127.

The lever 130 may include a long lever arm 139 on an outer side of the hinge 125. The length of the lever arm 139 is determined according to the minimum amount of leverage force required to shift the valve head 140 from the open 140o to the closed position 140c and vice versa. Ideally, the length of the lever arm 139 is about 2-5 times, and preferably 3-4 times the length of a lifting arm 137. The lifting arm 137 being the section of the lever 130 between the hinge aperture at 125 and the slot 135.

The lever arm 139 is preferably weighted to provide a counter-weight to the weight of the valve head 120 and the shaft 160, so that the amount of force required to move the valve head between the closed and open positions is relatively balanced. Ideally, the lever 130 includes an over-centre mechanism to favour the closed position $140_c$ and the open position $140_o$, but not an intermediate position between positions $140_{c,o}$. Movement of the lever 130 may be powered by a solenoid or ram mechanism, and may be operated by a switch device. The lever 130 may be operated remotely.

The terminal NRV 110 has application in forming a valve at the terminal end of a pipe and, as such, may be suitable for the control of the flow from a terminal feeder pipe into a channel or dam.

Figures 11A, 11B:
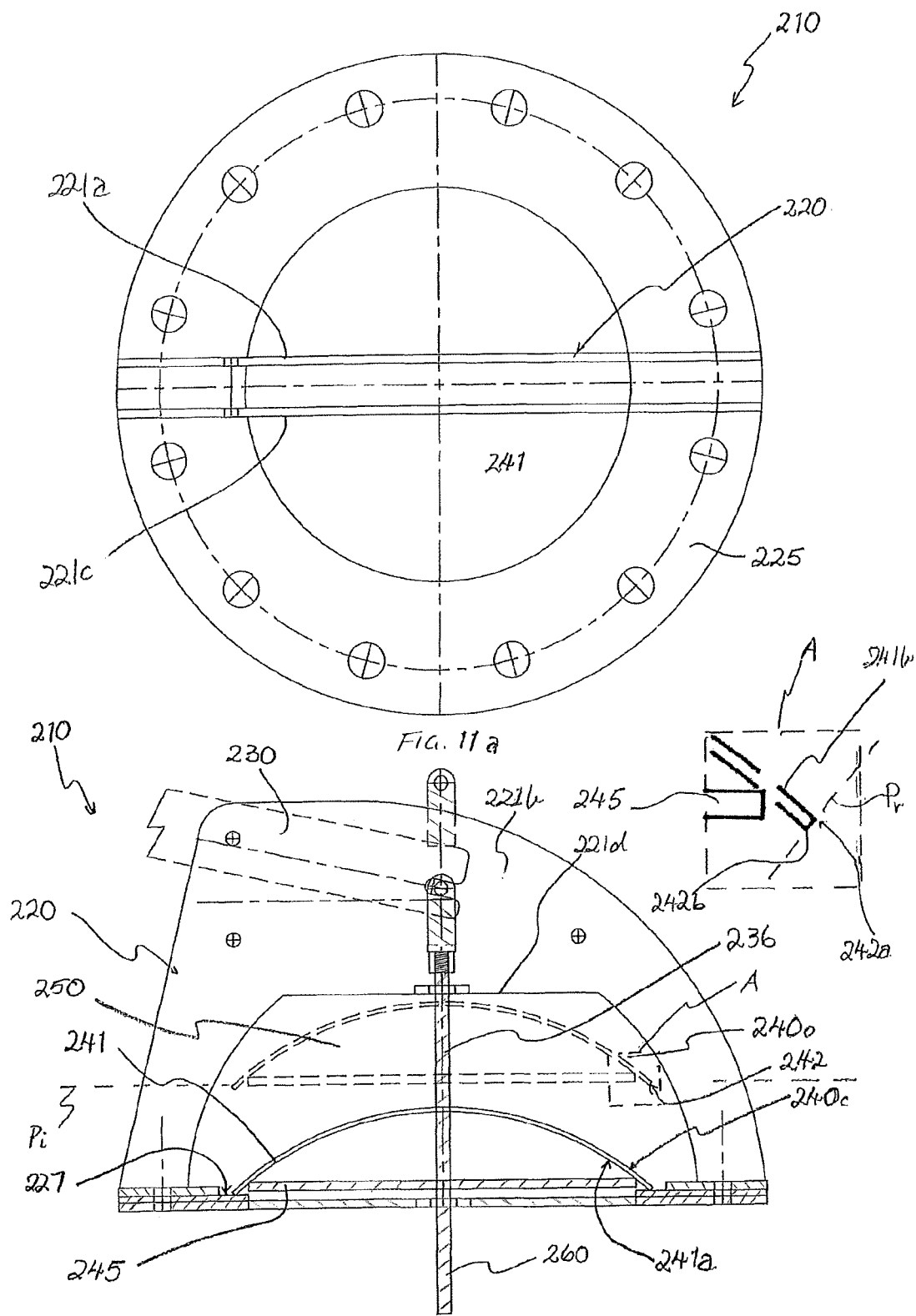
FIG. 11a is a top plan view of a valve assembly according to a third embodiment shown.
FIG. 11b is a side sectional view of the valve assembly according to the third embodiment, with the valve head shown in open and closed positions.

FIGS. 11a-b show a third embodiment in the form of a non return valve (NRV) 210 that is similar in structure and function to the second embodiment. However, The valve head 240 is in the form of a shallow dome 241 that may comprise the upper portion of a part-spherical dome cut out of a semi-spherical dome piece such as the dome 141 shown in FIG. 8. A circular internal plate 245 extends laterally within the dome 241 The internal plate 245 is attached to the inside surface of the dome wall 241a by welds. The internal plate 245 lies in a plane normal to a shaft axis 236. The internal plate 245 has a central aperture through which the shaft 260 extends. in fixed relationship with the valve head 240 compared to the shaft 260. The valve head 240 is movable relative to a valve seat 227. In FIG. 11b, the valve head 240 is shown in a closed position 240c in which a lower peripheral edge 242 in solid lines, and in an open position 240o in which the valve head 240 is shown in broken lines.

The location of the internal plate 245 close to the peripheral edge 242 reduces the volume of internal space defined by the dome 242 that is outside a cavity 250 and below the internal plate 245 to a negligible volume. The lower surface of the internal plate 245 may be loosely aligned in a plane Pi that lies traverse with the axis 236, such that the uppermost edge 242a of the peripheral edge 242 lies in the plane Pi or close to the plane Pi. For example, with reference to expanded view A in FIG. 11b, the outer corner 242a seen in section of the peripheral edge 242 lies substantially in the plane Pi. As the peripheral edge 242, when viewed in section, is cut through a radial plane Pr relative to the curved or radiussed surface 241, the lowermost corner edge of the dome wall 242 presents a sharp edge 242b of small surface area to effect an effective seal with the valve seat 227.

The minimisation of the dome wall 241 skirt depending below the internal plate assists to reduce the amount of water and suspended material that may be temporarily trapped underneath the internal plate 245 within the lateral footprint of the dome wall 241.

The valve assembly 210 is supported by a pair of arms 221a,b having a truncated arch in which the lower edge 221d of the bridge 221b is a straight edged and the bridge 221b shape is broader to better obscure the upper portion 261 of the shaft 260.

Figure 12:
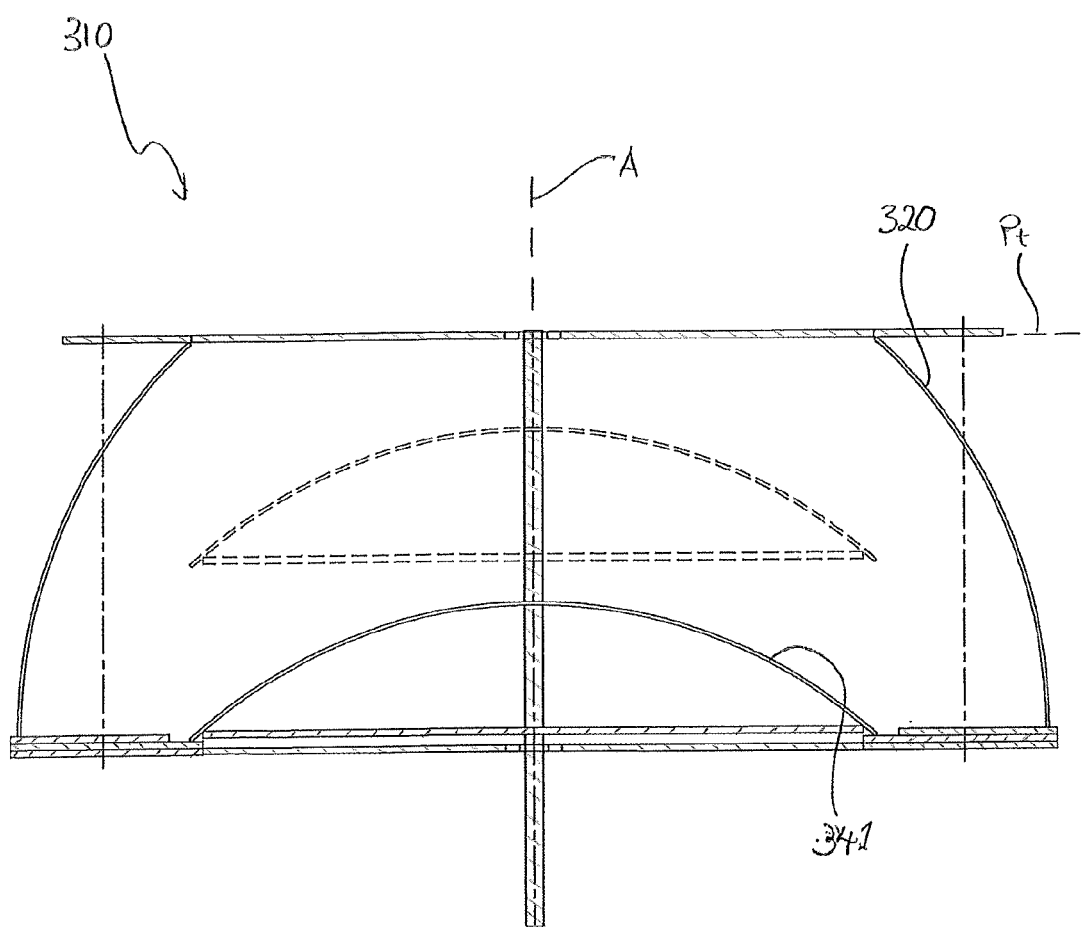
FIG. 12 is a side sectional view of a valve assembly according to a fourth embodiment, with the valve head shown in open and closed positions.

In FIG. 12 a non return valve 310 according to a fourth embodiment is shown that is similar in concept to the first embodiment and a dome 341 is provided that is similar in shape to the dome 241 of the third embodiment. However, the dome 341 and an associated valve body 320 are formed by cutting a single hemi-spherical piece through a plane Pt transverse to its axis A.

Figure 13:
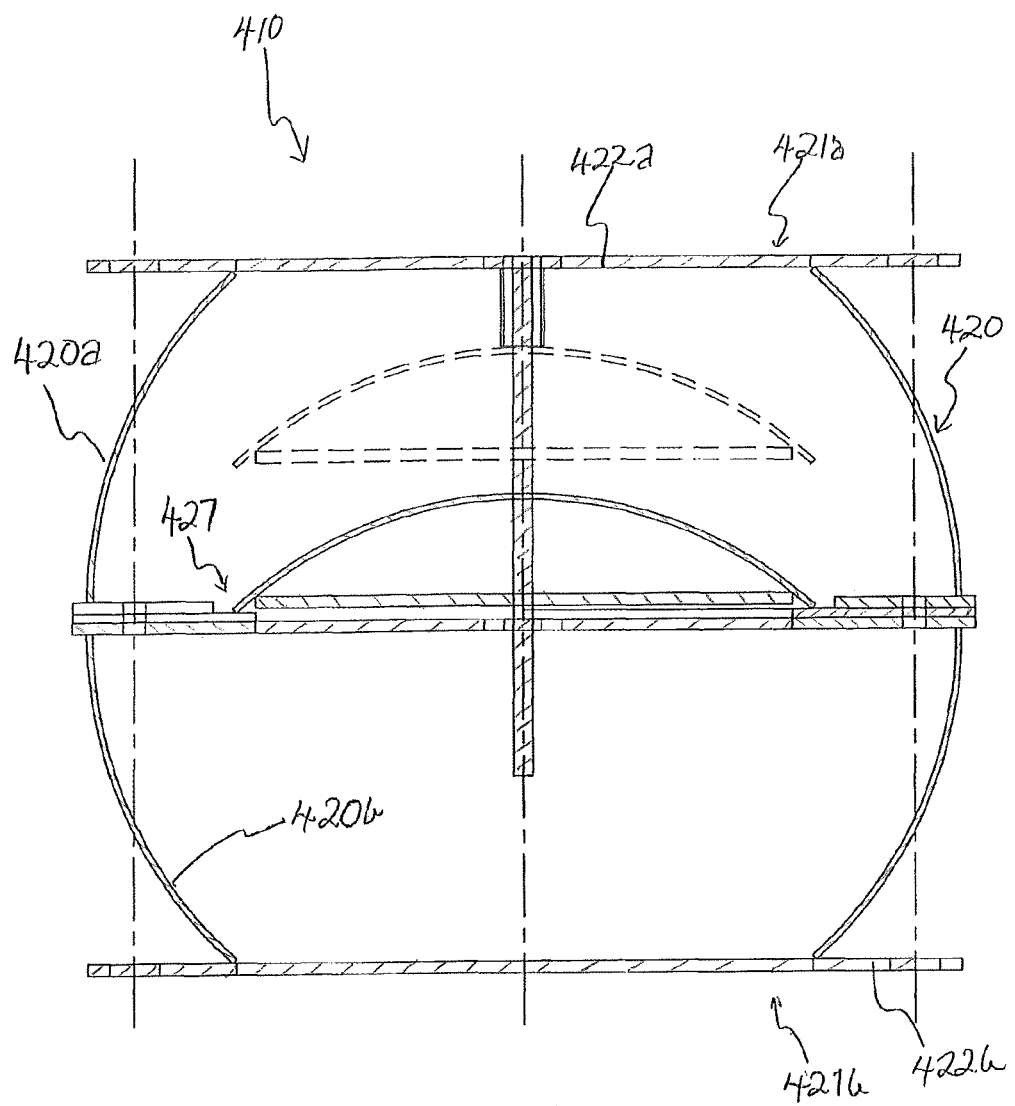
FIG. 13 is a side sectional view of a valve assembly according to a fifth embodiment, with the valve head shown in open and closed positions.

FIG. 13 shows a NRV 410 that is similar in concept to the fourth embodiment shown in FIG. 12 with a larger valve body 420 formed by attaching two similarly semi-hemi-spherically shaped valve bodies in opposed orientation such that their wider openings are joined to opposite sides of a valve seat 427 structure. The narrow opening end 421a of the first valve body 420a component is connected to a pipe mating plate 422a of a downstream pipe. The narrow opening end 421b at the opposite end of valve assembly 410 of the second valve body 420b component is connected to a pipe mating plate 422b of an upstream pipe.

Figure 14:
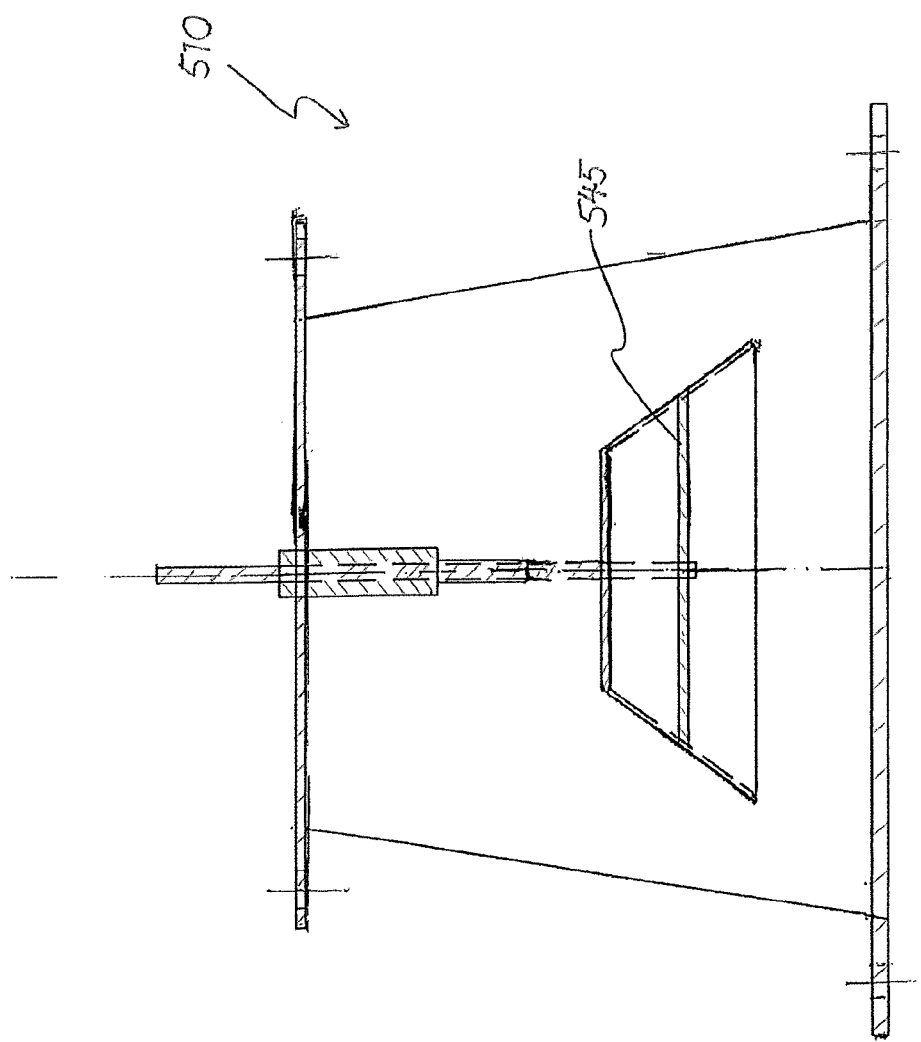
FIG. 14 is a schematic side sectional view of a valve assembly according to a sixth embodiment.

FIG. 14 shows a valve assembly 510 according to a sixth embodiment having a similar function and operation to that of the first embodiment, and including an internal plate 545 intermediate the length of a valve head 540 that is in the form of a truncated cone.

Figure 15:
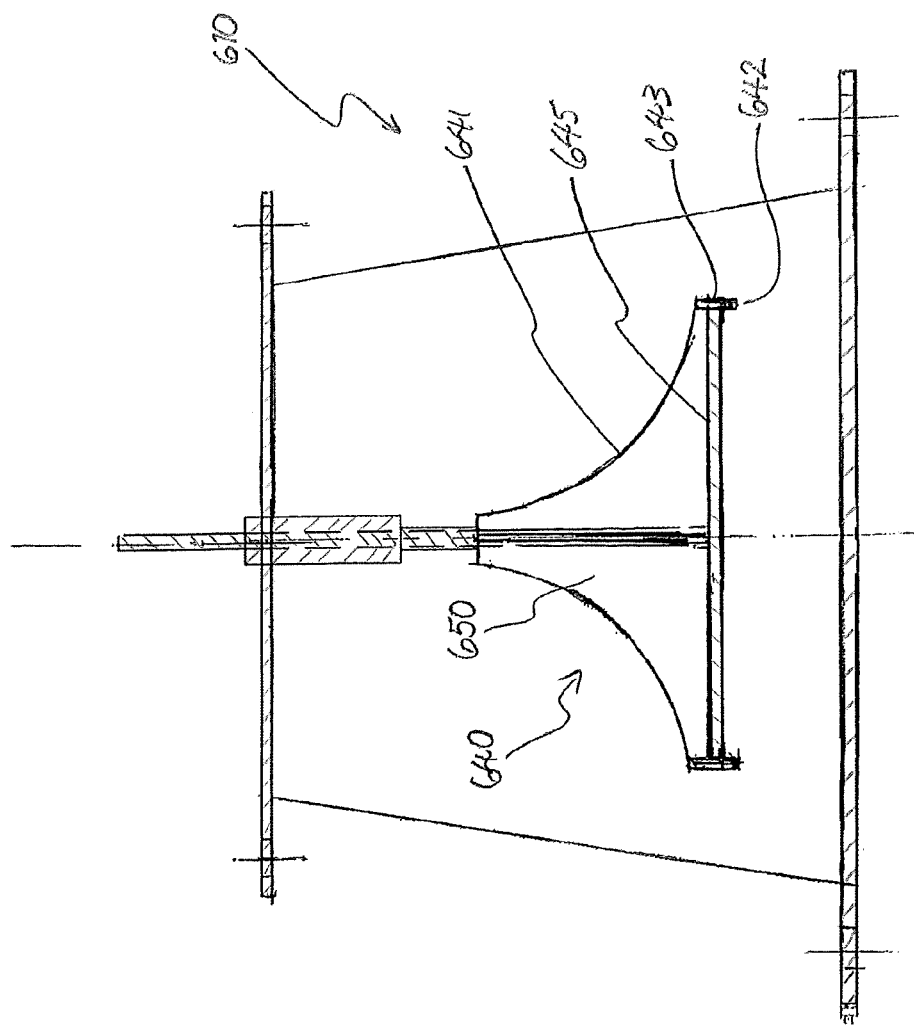
FIG. 15 is a schematic side sectional view of a valve assembly according to a seventh embodiment

FIG. 15 shows a valve assembly 610 according to a seventh embodiment having a similar function and operation to that of the sixth embodiment, and including an internal plate 645 located at or near the lowermost region of the wall 641 of the valve head 640. The valve head wall 641 is concave shaped whereby the internal cavity 650 that the valve head wall 641 and the internal plate 645 define is small compare to the truncated conical or semi-spherical shaped dome walls. To provide an effective structure for the peripheral edge of the internal plate 645 to be attached to, a cylindrical skirt or flange 643 is attached to the peripheral edge of the concave valve head wall 641. The lower most edge 642 of the valve head wall 641 is formed from the lower most edge of the cylindrical skirt 643 and can be worked to suit the head pressure drop of the particular application. For example, a sharp edge may be desirable for lower head pressure drops, whereas a broad edge surface may be more appropriate for large head pressure drops.

The features and components of each of the embodiments of the invention described in the detailed description and/or depicted in the accompanying drawings may be interchangeable as required, with regard to functional equivalency and compatibility. Just because a feature or component is only described with reference to one or not all embodiments, does not mean that it cannot be included with another embodiment of the invention in relation to which it has not been expressly described. Furthermore, just because a feature or component is described in relation a particular embodiment, it may yet be within the scope of the invention to omit the feature or component from the embodiment, unless the context and expressions used impute that the feature or component is essential to the invention as broadly described.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

The prefix "semi" means "partial", including "half" or a part thereof. The prefix "hemi" generally means "half" or "about half".

In the present specification, object terms such as "apparatus", "means", "device" and "member", or similar terms, may refer to singular or plural items and are terms intended to refer to a set of properties, functions or characteristics performed by one or more items or components having one or more parts. It is envisaged that where the object term is described as being a unitary object, then a functionally equivalent object having multiple components is considered to fall within the scope of the object term, and similarly, where the object term is described as having multiple components, a functionally equivalent but unitary object is also considered to fall within the scope of the object term, unless the contrary is expressly stated or the context requires otherwise.

Where the word "for" is used to qualify a use or application of an object term, the word "for" is only limiting in the sense that the device or component should be "suitable for" that use or application.

Orientational terms used in the specification and claims such as vertical, horizontal, top, bottom, upper and lower are to be interpreted as relational and are based on the premise that the component, item, article, apparatus, device or instrument will usually be considered as if in a particular orientation, typically with the apex of the dome uppermost. However, the valve assembly or non-return valve may be oriented sideways or upside down, so that the apex, in some applications, may be oriented sideways or downward. It will be appreciated by those skilled in the art that many modifications and variations may be made to the methods of the invention described herein without departing from the spirit and scope of the invention.

The following table provides a non-exhaustive list of indicative reference numerals for features and components included in the drawings.

| Ref | Description | Ref | Description |
|---|---|---|---|
| | | 2 | Upstream |
| | | 4 | Downstream |
| 10 | Valve assembly | | |
| 110 | Non return valve (NRV) | | |
| 20 | Valve body | 21 | Truncated cone wall |
| | | 22 | Wide base defining a preferably central aperture |
| | | 23 | Upper narrower neck |
| | | 24 | Upper terminal collar, flange or circular plate |
| | | 25 | Rigid circular plate |
| | | 26 | Pair of superimposed circular plates forming aperture |
| | | 26b | Lower most plate |
| | | 27 | Upper surface of base forming the valve seat |
| | | 28 | Inner spokes extending from the lower plate to a central ring forming a star bracket |
| | | 29 | Ring supporting the spokes |
| | | 30 | Lower bearing surface |
| | | 31 | Lower valve opening |
| | | 32 | Upper valve opening |
| | | 33 | Upper inner spokes |
| | | 34 | Upper central ring |
| | | 35 | Upper bearing |
| | | 36 | Longitudinal axis |
| 40 | Valve head | 41 | Dome |
| | | 41a | Dome wall |
| | | 42 | Lower peripheral edge |
| | | 43 | Aperture near apex |
| | | 43b | Apex at central dome aperture |
| | | 44 | Transverse plane |
| | | 45 | Internal plate in dome |
| | | 46 | Central aperture in internal plate |
| | | 47 | Height of dome |
| | | 48 | Skirt of dome |
| | | 49 | Recess defined by the skirt and the lower side of the internal plate |
| | | 50 | Recess defined by the dome wall and the upper surface of the internal plate |
| | | 51 | Axial displacement distance of valve head |
| | | 52 | Intervening space immediately downstream of the valve opening |
| | | 53 | Gap between lower edge and the valve seat |
| | | 54 | Valve body cavity |
| 60 | Central shaft | 61 | Upper section of shaft |
| | | 62 | Intermediate portion of shaft |
| | | 63 | Intermediate bearing surface |
| | | 64 | Lowermost end of intermediate bearing surface |
| | | 65 | Lower portion of shaft |
| | | 66 | Axial compression spring |

-continued

| Ref | Description | Ref | Description |
|---|---|---|---|
| 80 | Dampener | 81 | Cylinder |
| | | 82 | Central bore |
| | | 83 | End of bore of cylinder |
| | | 84 | Side port |
| | | 85 | Small aperture at end of bore |
| | | 86 | Lower end of cylinder |
| 110, 210 | Valve assembly | P1 | Plane of first arm |
| | | P2 | Plane of second arm |
| | | P3 | Plane of lever |
| | | Pi | Plane of internal plate |
| 120, 220 | Support structure | 120a, 220a | First arm |
| 221d | Lower edge of bridge | 121b, 221b | Bridge |
| | | 121c, 221c | Second arm |
| | | 122a | Steep side wall edge of first leg |
| | | 122b | Corner |
| | | 123 | Base |
| | | 125 | Hinge |
| | | 126a | Upper circular plate |
| | | 126b | Bolt fasteners |
| | | 126c | Lower circular plate |
| 227 | Valve seat | 127 | Valve seat structure |
| | | 128a | Spokes |
| | | 128b | Ring |
| | | 129a | Upper region |
| | | 129b | Spacer bolts |
| 130 | Lever | 131 | Valve opening |
| | | 133 | Ferrule |
| | | 134 | Pin |
| | | 135 | Slot |
| | | 136, 236 | Shaft axis |
| | | 137 | Lifting arm |
| | | 139 | Long lever arm |
| 140, 240 | Valve head | 140o, 240o | Open position |
| | | 140c | Closed position |
| 241 | Shallow dome | 141 | Dome wall |
| 241a | Dome wall | 142, 242 | Lower peripheral edge |
| 241b | Radiussed surface | 143 | Aperture |
| 242a | Outer peripheral edge | 143b | Apex |
| 242b | Sharp lower peripheral edge | 145, 245 | Internal plate |
| 160, 260 | Shaft | 161, 261 | Upper portion of shaft |
| | | 165 | Lower portion of shaft |

The invention claimed is:

1. A valve assembly including a valve body and a non-planar valve head adapted to be fitted to a water supply line, wherein:
the valve head is adapted to reciprocally travel along a longitudinal axis, supported by a shaft longitudinally aligned parallel to a general direction of water flow from the supply line; and
the valve head includes a wall terminating in a peripheral sealing contact surface for sealing engagement with a valve seat in the valve body, the valve seat defining a valve opening that is adapted to be releasably sealed by the valve head and continuous with the supply line when the valve assembly is in an open position, the wall extending inwardly from the peripheral sealing contacting surface toward the shaft,
wherein:
the wall is in the form of a skirt and the peripheral sealing contact surface is in the form of a terminal edge that is formed from a downwardly depending edge of the wall;
the width of the terminal edge corresponds to or is narrower than the wall thickness;
the valve body has a wide base at its upstream end and a narrower neck at its downstream end;
the shaft is secured radially relative to the valve body using at least two axially spaced bearing surfaces;
interposed between the axially spaced bearing surfaces is a spring bias against the open position; and
the valve head is adapted to axially shift toward downstream to an extent that its displacement distance is of a magnitude at least one quarter of the diameter of a valve opening to provide sufficient clearance by the valve head.

2. The valve assembly of claim 1, wherein the valve body is in the form of a truncated cone.

3. The valve assembly of claim 1, wherein the valve seat has a resiliently deformable surface.

4. The valve assembly of claim 1, wherein the wall is in the form of a dome.

5. The valve assembly of claim 1, wherein the wall terminates in and forms the peripheral sealing contact surface.

6. The valve assembly of claim 1, wherein the valve head is co-axially mounted to the shaft that is secured using an upper bearing surface located at or near the neck of the valve body.

7. The valve assembly of claim 6, wherein the at least two axially spaced bearing surfaces include a lower bearing surface located at or near the base of the valve body.

8. The valve assembly of claim 1, wherein the at least two axially spaced bearing surfaces include a first bearing surface that is located in an aperture at the apex of a dome of the valve head.

9. The valve assembly of claim 8, wherein the at least two axially spaced bearing surfaces include a second bearing surface that is located in a co-axially aligned plate bearing that is formed in a central aperture located in an internal plate through which the shaft passes.

10. The valve assembly of claim 1, wherein the valve body has a wider diameter end positioned lower than an upper narrower neck.

11. The valve assembly of claim 1, wherein the shaft is adapted for reciprocal linear travel in a dampener cylinder.

12. The valve assembly of claim 11, wherein a portion of the shaft extends into the dampener cylinder and the cylinder includes one or more apertures extending through the cylinder's wall that are adapted to progressively allow displacement of fluid in a bore of the cylinder as a terminal end of the shaft travels towards an end of the cylinder.

13. The valve assembly of claim 1, wherein in a sealed and closed position, the valve head maintains the integrity of its shape and structure.

14. The valve assembly of claim 6, wherein the upper bearing surface is laterally secured using an upper bracket attached to the valve body.

15. The valve assembly of claim 14, wherein the lower bearing surface is laterally secured using a star shaped bracket having one or more lateral spokes.

16. The valve assembly of claim 1, wherein the valve head is adapted to axially travel a maximum distance which is a displacement distance of a magnitude at least one quarter of a diameter of the aperture to provide sufficient clearance by the valve head such that water flow in a downstream direction is unimpeded as it flows into a space between the valve seat and the valve head and around the sides of the valve head as it travels in the downstream direction.

17. The valve assembly of claim 9, wherein, together with the valve head, the internal plate defines a cavity in the valve head.

18. The valve assembly of claim 9, wherein the skirt extends beyond the junction of an internal surface of the valve head and a peripheral edge of the internal plate.

19. The valve assembly of claim 1, wherein the valve head is formed from a hemi-spherical component.

20. A valve assembly including a valve body and a valve head fitted to a supply line,
wherein:
   the valve head is adapted to reciprocally travel along a longitudinal axis, supported by a shaft longitudinally aligned parallel to a general direction of water flow from the supply line; and
   the valve head includes a wall terminating in a peripheral sealing contact surface for sealing engagement with a valve seat in the valve body, the valve seat defining an aperture that is continuous with the supply line when the valve assembly is in an open position, the wall extending inwardly from the peripheral sealing contacting surface toward the shaft,
wherein:
   the wall is in the form of a skirt and the peripheral sealing contact surface is in the form of a terminal edge which corresponds to or is narrower than the wall thickness, and
   the valve body and the valve head are formed from a single dome piece.

* * * * *